Patented Apr. 5, 1949

2,466,125

UNITED STATES PATENT OFFICE 2,466,125

AMINATION OF HALOBENZENESULFONYL-CHLORIDES

George W. Seymour and Victor S. Salvin, Cumberland, and Wilford Donald Jones, Cresaptown, Md., assignors to Celanese Corporation of America, a corporation of Delaware No Drawing. Application February 14, 1946, Serial No. 647,654

9 Claims. (Cl. 260—556)

This invention relates to an improved amination process and relates more particularly to an improved process for the amination of aromatic sulfonyl chlorides such as, for example, 4-chloro-3-nitro-benzene sulfonyl chloride.

An object of this invention is to provide a more efficient and economical process for the amination of aromatic sulfonyl chlorides whereby sulfonamides are obtained.

Another object of this invention is the provision of an improved process for the production of 4-chloro-3-nitro-benzene sulfonamide by the direct amination of 4-chloro-3-nitro-benzene sulfonyl chloride with aqueous ammonia whereby said sulfonamide is obtained in high yield and of an excellent degree of purity.

Other objects of this invention will appear from the following detailed description.

The amination of aromatic sulfonyl chlorides whereby sulfonamides are obtained has previously been effected in an aqueous medium containing alkaline agents such as ammonium carbonate and sodium hydroxide. While fairly satisfactory yields may be obtained by this process, substantial losses are sustained which are not only due to hydrolysis of the sulfonyl chloride group to a sulfonic acid group but also to the difficulty of separating the product because of its substantial solubility in the reaction medium. In addition, where a labile halogen, such as chlorine, is present on the aromatic nucleus, there is a strong tendency on the part of chlorine to be replaced by an amino group where fairly concentrated solutions of ammonia are employed as the aminating agent. Furthermore, due to the alkalinity of the reaction liquors, a considerable proportion of the sulfonamides formed during the course of the reaction remains in solution and their separation involves the neutralization of the reaction liquors in order to recover the dissolved product.

We have now found that aromatic sulfonyl chlorides and particularly aromatic sulfonyl chlorides containing a labile halogen on the aromatic nucleus may be aminated directly in a more efficient and economical manner. In accordance with the novel process of our invention, we aminate said aromatic sulfonyl chlorides employing dilute aqueous solutions of ammonia as the aminating agent while maintaining a relatively high mol ratio of ammonia to the sulfonyl chloride. Preferably, the reaction is effected at relatively low temperatures, e. g. temperatures of about 0 to 10° C. employing aqueous solutions containing from 2 to 4% by weight of ammonia, from 4 to 6 mols of ammonia being present for each mol of the sulfonyl chloride. The sulfonamides thus formed are usually quite insoluble under these reaction conditions and the insoluble product may then be filtered directly from the reaction liquors. Additional quantities of ammonia may be added to the recovered filtrate and the fortified filtrate thereby obtained may be employed again for further aminations. Conversion of the sulfonyl chlorides to sulfonamides in accordance with our process yields a product of relatively high purity and yields of 90 to 95% of theoretical are usually obtained.

Thus, for example, in the amination of 4-chloro-3-nitro-benzene sulfonyl chloride, which compound contains a labile chlorine due to the presence of the ortho-nitro group, employing aqueous ammonia as the aminating agent, to form 4-chloro-3-nitro-benzene sulfonamide, optimum results are achieved with minimum replacement of the labile chlorine employing an aqueous solution containing about 3% by weight of ammonia, a sufficient quantity of said solution being employed so that the mol ratio of ammonia in the reaction mixture comprises about 5 mols of ammonia for every mol of 4-chloro-3-nitro-benzene sulfonyl chloride. The reaction is preferably effected at a temperature of about 0° C., for from 6 to 12 hours. The 4-chloro-3-nitro-benzene sulfonamide formed is almost wholly insoluble in the reaction mixture under these conditions and may be separated therefrom by the usual filtration operations. If desired, the filtrate may then be refortified with the necessary quantity of ammonia to give the desired concentration and mol ratio of ammonia, and may again be employed for aminating additional amounts of 4-chloro-3-nitro-benzene sulfonyl chloride. The 4-chloro-3-nitro-benzene sulfonamide obtained is quite pure and, even without further purification, such as recrystallization, has a relatively high melting point. The melting point of the crude product is only slightly below that of a product which has been purified by recrystallization. The yield obtained is generally 95% or more of theoretical.

In order further to illustrate our invention but without being limited thereto, the following example is given:

Example 51 parts by weight of finely divided 4-chloro-3-nitro-benzene sulfonyl chloride are added with stirring to 564 parts by weight of a 3% by weight aqueous solution of ammonia cooled to 0° C., this quantity of aqueous ammonia giving a 5 mol ratio of ammonia to the 4-chloro-3-nitro-benzene sulfonyl chloride added. The suspension obtained on addition of the 4-chloro-3-nitro-benzene sulfonyl chloride is stirred for 10 hours at 0° C. The reaction is then substantially complete. The completion of the reaction may be determined by titrating the free base present. When no change in the ammonia concentration is observed the reaction is substantially complete. The 4-chloro-3-nitro-benzene sulfonamide produced is an insoluble white or gray-white solid which remains in suspension and may be filtered directly from the solution. The solid product is washed several times with cold water, washed again with 0.5% hydrochloric acid, followed by a final wash with water to neutrality. The melting point of the crude 4-chloro-3-nitro-benzene sulfonamide obtained is about 166° C. The product may be recrystallized from dilute alcohol and the purified product melts at 175° C. The original high melting point is indicative of the substantial purity of the crude product initially obtained. A yield of 43.9 parts by weight of dry 4-chloro-3-nitro-benzene sulfonamide is obtained which comprises about 95% of theoretical. The high purity of the crude product enables it to be employed directly in the preparation of various diphenylamine dyestuffs without any intermediate recrystallization.

It is to be understood that the foregoing detailed description is given merely by way of illustration and that many variations may be made therein without departing from the spirit of our invention.

Having described our invention, what we desire to secure by Letters Patent is:

1. Process for the amination of aromatic sulfonyl chlorides containing a labile halogen whereby aromatic sulfonamides containing said labile halogen are obtained, which comprises reacting an aromatic sulfonyl chloride of the benzene series and containing a labile halogen and a sulfonyl chloride group as the sole reactive groups on the benzene nucleus with a dilute aqueous solution of ammonia at a temperature of about 0 to 10° C. employing 4 to 6 mols of ammonia for each mol of the sulfonyl chloride present.

2. Process for the amination of aromatic sulfonyl chlorides containing a labile halogen whereby aromatic sulfonamides containing said labile halogen are obtained, which comprises reacting an aromatic sulfonyl chloride of the benzene series and containing a labile halogen and a sulfonyl chloride group as the sole reactive groups on the benzene nucleus with a dilute aqueous solution containing from 2 to 4% by weight of ammonia at a temperature of about 0 to 10° C. employing 4 to 6 mols of ammonia for each mol of the sulfonyl chloride present.

3. Process for the amination of aromatic sulfonyl chlorides containing a labile halogen whereby aromatic sulfonamides containing said labile halogen are obtained, which comprises reacting an aromatic sulfonyl chloride of the benzene series and containing a labile halogen and a sulfonyl chloride group as the sole reactive groups on the benzene nucleus with a dilute aqueous solution containing from 2 to 4% by weight of ammonia at a temperature of about 0 to 10° C. employing 4 to 6 mols of ammonia for each mol of the sulfonyl chloride present and continuing the reaction for from 6 to 12 hours.

4. Process for the amination of 4-chloro-3-nitro-benzene sulfonyl chloride whereby 4-chloro-3-nitro-benzene sulfonamide is obtained, which comprises reacting at a temperature of about 0 to 10° C. 4-chloro-3-nitro-benzene sulfonyl chloride with a dilute aqueous solution containing from 2 to 4% by weight of ammonia.

5. Process for the amination of 4-chloro-3-nitro-benzene sulfonyl chloride whereby 4-chloro-3-nitro-benzene sulfonamide is obtained, which comprises reacting 4-chloro-3-nitro-benzene sulfonyl chloride with a dilute aqueous solution of ammonia at a temperature of 0 to 10° C. employing 4 to 6 mols of ammonia for each mol of 4-chloro-3-nitro-benzene sulfonyl chloride present.

6. Process for the amination of 4-chloro-3-nitro-benzene sulfonyl chloride whereby 4-chloro-3-nitro-benzene sulfonamide is obtained, which comprises reacting 4-chloro-3-nitro-benzene sulfonyl chloride with a dilute aqueous solution containing 2 to 4% by weight of ammonia at a temperature of 0 to 10° C. employing 4 to 6 mols of ammonia for each mol of 4-chloro-3-nitro-benzene sulfonyl chloride present.

7. Process for the amination of 4-chloro-3-nitro-benzene sulfonyl chloride whereby 4-chloro-3-nitro-benzene sulfonamide is obtained, which comprises reacting 4-chloro-3-nitro-benzene sulfonyl chloride with a dilute aqueous solution containing 2 to 4% by weight of ammonia at a temperature of 0 to 10° C. employing 4 to 6 mols of ammonia for each mol of 4-chloro-3-nitro-benzene sulfonyl chloride present and continuing the reaction for from 6 to 12 hours.

8. Process for the amination of 4-chloro-3-nitro-benzene sulfonyl chloride whereby 4-chloro-3-nitro-benzene sulfonamide is obtained, which comprises reacting 4-chloro-3-nitro-benzene sulfonyl chloride with a dilute aqueous solution containing 2 to 4% by weight of ammonia at a temperature of about 0° C. employing about five mols of ammonia for each mol of 4-chloro-3-nitro-benzene sulfonyl chloride present, and continuing the reaction until the concentration of ammonia in the reaction mixture remains substantially constant.

9. Process for the amination of 4-chloro-3-nitro-benzene sulfonyl chloride whereby 4-chloro-3-nitro-benzene sulfonamide is obtained, which comprises reacting 4-chloro-3-nitro-benzene sulfonyl chloride with a dilute aqueous solution containing about 3% by weight of ammonia at a temperature of about 0° C. employing about five mols of ammonia for each mol of 4-chloro-3-nitro-benzene sulfonyl chloride present, and continuing the reaction for 10 hours.

GEORGE W. SEYMOUR.
VICTOR S. SALVIN.
WILFORD DONALD JONES.

REFERENCES CITED

The following references are of record in the file of this patent:

UNITED STATES PATENTS

| Number | Name | Date |
| --- | --- | --- |
| 2,133,787 | Northey | Oct. 18, 1938 |
| 2,202,219 | Mietzsch et al. | May 28, 1940 |
| 2,237,372 | Simons | Apr. 8, 1941 |
| 2,288,531 | Klarer | June 30, 1942 |
| 2,358,465 | McNally et al. | Sept. 19, 1944 |

OTHER REFERENCES

Gelmo et al., Journal fur Praktische Chemie, vol. 77 (1908), pp. 371–372.

Kermack et al., Journal Chemical Society (London) 1939, p. 609.

Northey et al., Chemical Reviews, vol. 27 (1940), pp. 187–188.

Fischer et al., Berichte der Deutschen chemischen Gesellschaft, vol. 24, pp. 3187–3190.